United States Patent [19]

Miller

[11] 3,987,736
[45] Oct. 26, 1976

[54] REUSABLE PNEUMATIC DUNNAGE DEVICE

[75] Inventor: William Don Miller, Pismo Beach, Calif.

[73] Assignee: Gordon M. Newby, Huntsville, Mo.; a part interest

[22] Filed: Mar. 17, 1975

[21] Appl. No.: 558,803

[52] U.S. Cl. .............................. 105/491; 105/468; 105/496; 214/10.5 D
[51] Int. Cl.² ...................... B60P 7/14; B60P 7/16; B61D 45/00; B61D 49/00
[58] Field of Search .......... 105/410, 468, 491, 495, 105/496, 504; 214/10.5 D

[56] References Cited
UNITED STATES PATENTS

| | | | |
|---|---|---|---|
| 3,145,853 | 8/1964 | Langenberg | 214/10.5 D |
| 3,199,689 | 8/1965 | Feldkamp | 210/10.5 D X |
| 3,225,919 | 12/1965 | Swingle | 206/522 X |
| 3,342,142 | 9/1967 | Miller | 105/504 |
| 3,426,891 | 2/1969 | Marks | 214/10.5 D X |
| 3,592,142 | 7/1971 | Miller | 105/410 |
| 3,728,975 | 4/1973 | Jehu | 105/468 |

*Primary Examiner*—Robert G. Sheridan
*Assistant Examiner*—Howard Beltran
*Attorney, Agent, or Firm*—Chernoff & Vilhauer

[57] ABSTRACT

A reusable dunnage device which cushions goods from normal shocks during transit and withstands extreme impacts without damage. A pair of elongate boards are disposed adjacent an elongate, flexible, inflatable rubber tube on opposite sides thereof and this combination is placed vertically between parcels of goods. The boards and tube are held together and protected by an elongate canvass sack having a center pocket for receiving the tube and two side pockets for receiving the respective boards. The width of the tube when filled with air is greater than the width of the boards so that the device may be placed against the parcels of goods with the center, tubular portion of the sack abutting the parcels while the outer, board portions of the sack are disposed a distance away from the parcels. When the parcels move toward one another under normal shocks the tube will flex, thereby absorbing the shocks; but when an extreme impact is received the parcels will be stopped by the boards thereby preventing complete flattening of the tube and accompanying rupture. The device is particularly adapted to be placed between parcels of panel products shipped in railroad cars and thereafter pressurized with air. Upon arrival of the goods at their destination the tube is deflated and reused or the boards are removed and the sack and tube are returned to a collection point.

9 Claims, 7 Drawing Figures

U.S. Patent  Oct. 26, 1976  3,987,736
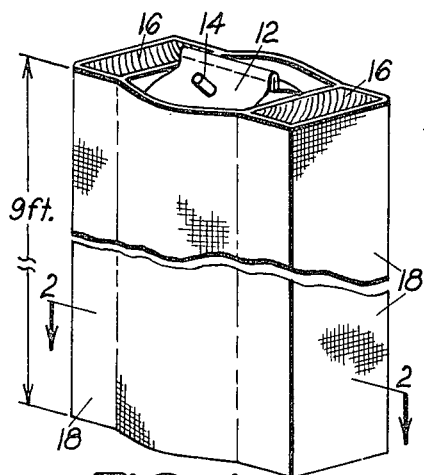
FIG. 1
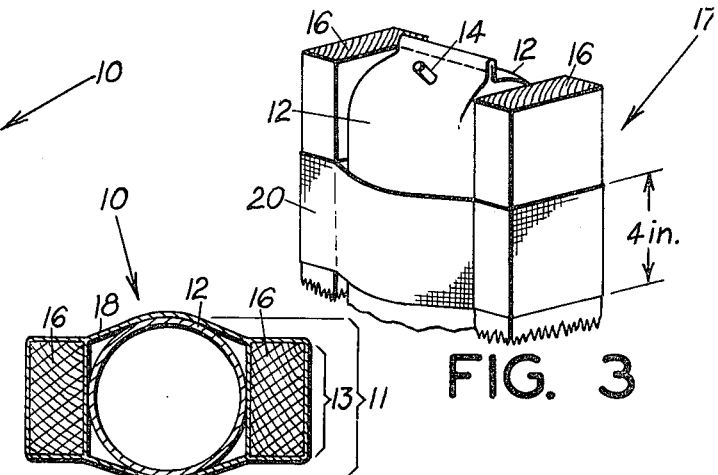
FIG. 2
FIG. 3
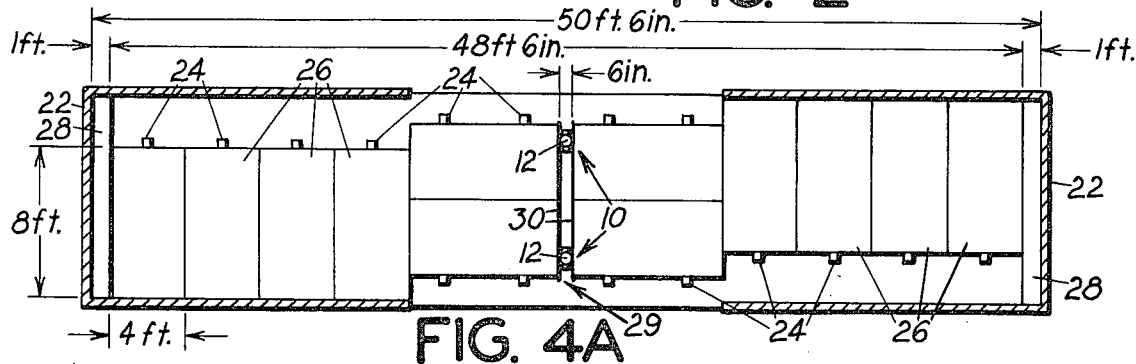
FIG. 4A
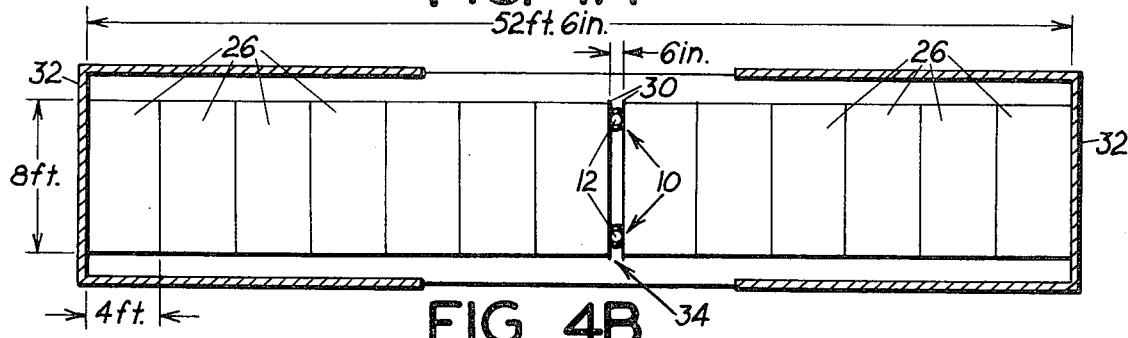
FIG. 4B
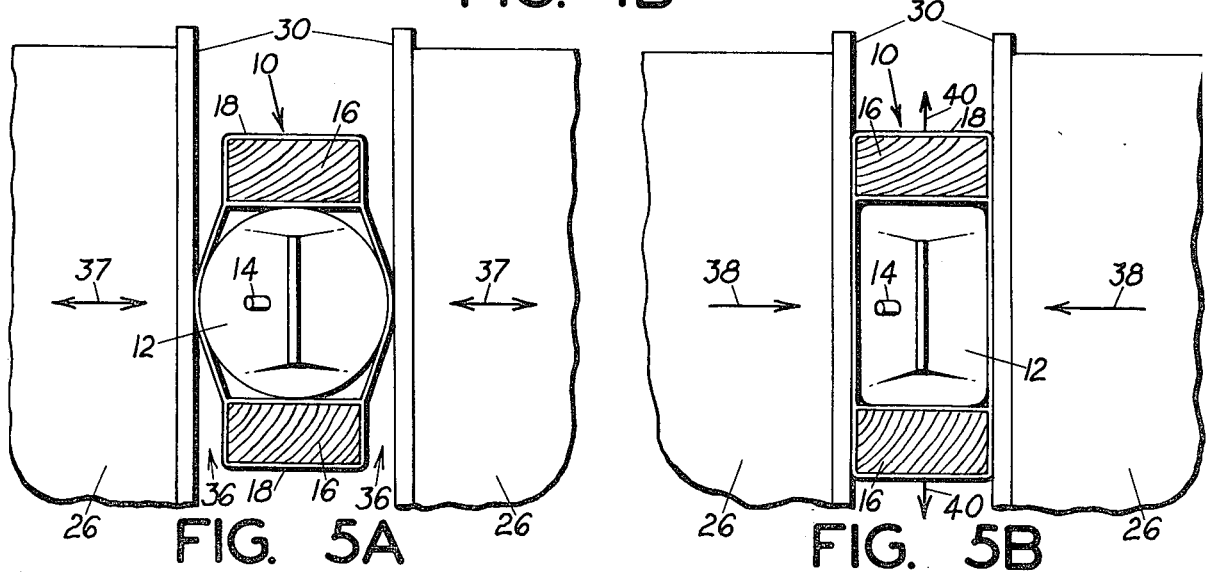
FIG. 5A
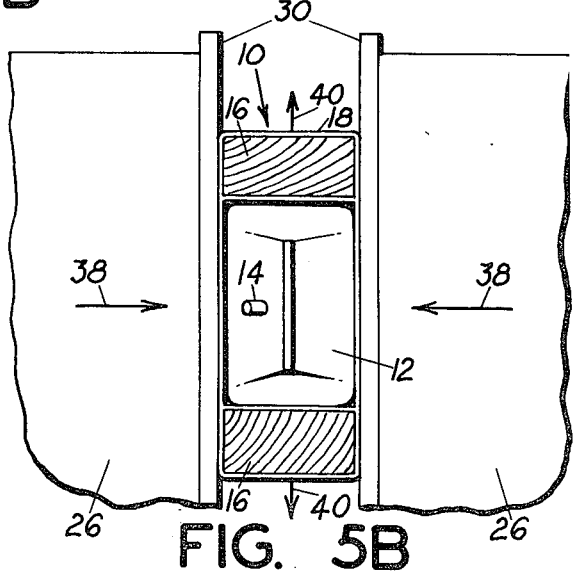
FIG. 5B

REUSABLE PNEUMATIC DUNNAGE DEVICE

BACKGROUND OF THE INVENTION

This invention relates to dunnage devices, particularly dunnage devices used to cushion panel products such as plywood from impact during shipping by railroad car.

Most panel products, particularly plywood, are manufactured in 4 ft. × 8 ft. sheets which are typically stacked in tiers for shipping in railroad boxcars of various standard lengths. Plywood tiers are ordinarily 33 in. high and are, in turn, stacked in parcels of three divided by strips of wood or pallets within the railroad car, each such parcel of stacked tiers being approximately 9 ft. high. Such parcels of plywood usually weigh about 9,900 lbs. apiece.

Some railroad boxcars, usually older ones, are 40 ft. 6 in. in interior length and thus accommodate up to ten parcels of plywood tiers therein leaving 6 inches of additional space to be filled by dunnage, ordinarily at the center of the car. A more common size of boxcar is 50 ft. 6 in. in length and thus will accommodate up to 12 parcels of plywood tiers leaving 30 inches of space near the center of the car to be filled by dunnage. Some newer boxcars are being built with an interior length of 52 ft. 6 in. or 52 ft. 8 in. permitting up to 13 such parcels with six or eight inches, respectively, of space to be filled by dunnage. The most common size boxcar, 50 ft. 6 in. in length, is frequently equipped with a load-positioning system which includes a plurality of vertically oriented brace members removably attached interior to the car for changing the effective width of the interior, as disclosed in the present Applicant's U.S. Pat. No. 3,342,142, and one foot thick bulkheads at both ends of the car for strengthening the car ends against damaging impacts from the shifting of goods, as disclosed in the Applicant's U.S. Pat. No. 3,592,142; as a result, the effective inside length of such cars (commonly designated by the trademark "Ply-Pak Equipped") is 48 ft. 6 in. which accommodates up to 12 parcels of plywood tiers leaving six inches of space to be filled by dunnage. Therefore in many cases the space to be filled is six to eight inches wide.

A variety of approaches have been taken by shippers to fill the space between parcels of plywood within boxcars. In most cases rub strips of veneer are placed against the parcels on either side of the void leaving approximately four inches of space to fill. Some shippers simply wedge pieces of wood downwardly between the rub strips from the top of the load thereby rigidly holding the load in position and providing no cushion from the impacts occuring during switching of the railroad cars and transport in general.

Another approach heretofore taken has been to place a pair of vertically-oriented "two-by-fours" (a standard cut of wood having a rectangular cross-section approximately 1½ in. × 3½ in., although these dimensions are subject to changes in lumber industry standards) between the rub strips with their narrowest sides adjacent the rub strips and held upright by a third two-by-four nailed to the tops of the first two. This approach also provides no cushion against impact and furthermore may enable the load to shift violently for a short distance.

More sophisticated approaches have been taken utilizing inflatable air bags such as the air brace disclosed by Langenberg U.S. Pat. No. 3,145,853 which includes a pair of rub strips integral thereto, the dunnage device of Feldkamp U.S. Pat. No. 3,199,689 which discloses a disposable air bag, and the cargo cushion of Marks U.S. Pat. No. 3,426,891 showing an air bag having an exterior fabric cover for protecting the air bag and distributing impact forces. However, none is protected from virtually complete flattening as is often caused by the motion of one-half of a load (weighing approximately 59,000 lbs. for a 12 parcel car) toward the other half during extreme impact conditions. As a result, such air bags are frequently caused to rupture.

Therefore it can be seen that there is a need for a dunnage device particularly suited for shipping panel products, which are extremely dense and thus have considerable energy which must be absorbed during the shifting and bumping associated with the movement of railroad cars, whereby such dunnage device would provide cushioning against normal shock yet be able to withstand extreme impacts without rupture. Also the device should be reasonably inexpensive and minimize the amount of space required for returning it to a collection point for reuse by shippers.

SUMMARY OF THE INVENTION

The present invention provides a new and useful dunnage device which absorbs normal shocks and withstands extreme impacts without damage by utilizing an elongate tube filled with air, or some other compressible fluid, and disposed between two parallel elongate stop members for vertical placement between two parcels of stacked plywood tiers.

Cushioning of the load is provided by the elongate tube, which preferably is somewhat inflatable and made of rubber. As the parcels shift toward one another due to impacts and rapid motion the tube flexes to absorb their energy. The tube also should be deflatable for ease of placement between the parcels and for return to the shipping point, and it may be made in any convenient size, although the appropriate size is determined by the interior length of the boxcar and the size of the parcel products.

The stop members comprise a pair of elongate boards, ordinarily two-by-fours (described above) or "two-by-sixes" (a standard cut of wood having a rectangular cross-section approximately 1½ in. × 5½ in., subject to changes in lumber industry standards), and the width of the tube when unloaded by external lateral forces should be greater than the side of the boards adjacent the tube so that the tube will abut the parcels but the boards will not. This enables the tube to flex a predetermined amount yet prevents shifting of the heavy load from completely flattening the tube thereby rupturing it. These boards may be used or discarded at the receiving point.

The boards and tube are connected together preferably by an elongate canvass sack having a center pocket for receiving the tube and two outside pockets for receiving the boards. At the receiving end of the shipment the boards are removed from the sack and the sack and tube may be compactly folded for return to a collection point for reuse by shippers.

The dunnage device is utilized by placing two such packages in the six or eight inch space between parcels of stacked plywood tiers with the tube deflated and thereafter filling the tube with air to an appropriate pressure. When a load-positioning system is not utilized to decrease the effective interior width of the car the pressure may be increased to reduce the tendency of the load to shift from side-to-side.

It is therefore a principal objective of the present invention to provide a new and improved dunnage method and apparatus for protecting shipments of panel products in transit.

It is another principal objective of the present invention to provide a dunnage device which both absorbs normal shocks and withstands extreme impacts without damage to itself.

It is a further objective to provide such a dunnage device which may be conveniently returned to a collection point for reuse.

It is a principal feature of the present invention that it utilizes a flexible elongate rubber tube placed between two adjacent elongate boards whose sides adjacent the tube have a width less than the width of the tube when pressurized and unloaded by external forces.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a perspective view of the preferred embodiment of the dunnage device of the present invention.

FIG. 2 is a sectional top view of the preferred embodiment of the dunnage device of the present invention taken along line 2—2 in FIG. 1.

FIG. 3 is a perspective view of a portion of an alternative embodiment of the present invention.

FIG. 4A is a sectional top view of a standard-sized railroad boxcar having an interior length of 50 ft. 6 in., equipped with a load-positioning system which reduces its effective interior length to 48 ft. 6 in. and carrying parcels of plywood separated by the dunnage device of the present invention.

FIG. 4B is a sectional top view of a standard-sized railroad boxcar having an interior length of 52 ft. 6 in. and carrying parcels of plywood separated by the dunnage device of the present invention.

FIG. 5A is a top, detail view of the present invention in an unloaded condition inserted between two parcels of plywood.

FIG. 5B is a top, detail view of the present invention in a loaded condition inserted between two parcels of plywood.

DETAILED DESCRIPTION OF THE INVENTION

Referring to FIGS. 1 and 2, a principal part of the preferred embodiment 10 of the dunnage device is an elongate tube 12, ordinarily of circular cross-section, which is centrally located for placement between parcels of plywood to cushion their motion. Preferably the tube should be made of heavy, but relatively inexpensive, two-ply rubber with a hollow interior for receiving a compressible fluid, ordinarily air. While the tube should be flexible and somewhat inflatable it should not be greatly expandable, strength being an important characteristic. Each end should be permanently sealed by folding it over and vulcanizing it. The resulting thick folded pieces protect the ends of the tube, particularly at the bottom where the tube rubs against the floor of the boxcar since the dunnage device is vertically installed. For inflation the tube should be equipped with an air valve 14 at its top end.

A pair of elongate boards 16 having a rectangular cross-section are placed adjacent the tube 12 on opposite sides thereof to stop the parcels of plywood from moving too close together. In most cases the boards would be common two-by-fours. In some cases, such as with a railroad car 52 ft. 8 in. in length, two-by-sixes may be used. In any case the width 11 of the tube 12 from one side adjacent a parcel of plywood to the opposite side, that is in a dimension perpendicular to a line running through the centers of the tube and both boards, when the tube is unloaded by external forces should be slightly greater than one inch more than the corresponding width 13 of the boards 16 in the same dimension. Thus, where two-by-fours are used with the 3½ in. side adjacent the tube, the tube should be approximately five inches wide from parcel to parcel and where two-by-sixes are used with the 5½ in. side adjacent the tube, the tube should be approximately seven inches wide. It is recognized that boards, or stop members made of some other material, having other than a rectangular cross-section might also be used to a lesser advantage; in such cases their widths in the aforedescribed dimension should likewise be less than the width of the tube. The difference between the width of the tube and the width of the boards is the distance which loads may move toward one another under cushion of the rubber tube.

The entire package is held together in a sack 18 made of canvass or some other inexpensive material of suitable strength and durability. The sack includes a central pocket which holds the tube 12 and two outer pockets on opposite sides which hold the boards 16. The boards may be easily removed from their pockets for compact storage or return of the sack and tube to a collection point. In addition to holding the rubber tube and boards together the sack serves to protect the tube from damage due to abrasion or puncture. Since the parcels of plywood are ordinarily about 9 feet high, the tube, boards and sack should all be about 9 feet long; however, the narrow shape of the device conveniently minimizes the size of the tube and sack when folded up for shipment to the collection point.

Turning to FIG. 3, showing an alternative embodiment 17 of the dunnage device, the basic parts are essentially the same except that the sack 18 is replaced by a plurality of straps 20 made of canvass, leather or some other reasonably strong and durable material. The straps should be about four inches wide to ensure reasonable strength and stability in their position. The principal differences between this embodiment and the preferred embodiment are that while the strap-type device may be somewhat less expensive it provides less protection for the rubber tube.

Use of either embodiment of the dunnage device in a railroad car is illustrated in FIG. 4A. In this case the car is a boxcar 22 having a standard interior length of 50 ft. 6 in. Load-positioning equipment installed therein comprises a plurality of vertically-oriented posts 24 for positioning standard 4 ft. × 8 ft. parcels of plywood 26, and a pair of one foot thick bulkheads 28 for strengthening the ends of the car which reduce the effective interior length of the car to 48 ft. 6 in. With the plywood parcels placed inside the car and abutted against one another towards the two ends of the car, a 6 inch space 29 is left in which to insert two dunnage devices 10 and a pair of rub strips 30.

The dunnage devices are inserted vertically, with the rubber tube deflated for ease of insertion, and positioned with the boards to the side and the tube directly adjacent the two parcels of plywood, although separated by the sack wall and rub strips, so that when the rubber tube is pressurized with air the tube portion of the sack will abut the rub strips on both sides but the board portions of the sack will not touch either rub strip, thereby leaving the above-mentioned space in which the parcels can move toward one another, cushioned by the rubber tube. Once the devices are inserted the rubber tubes are filled through the air valve 14 from the top of the load to a pressure of five to ten p.s.i. When the shipment arrives at its destination the tube is deflated for removal of the dunnage from between the stacks. Since the space 29 is approximately 6 inches wide and a pair of rub strips take up about an inch of that space the rubber tube utilized in this case should be five inches in diameter.

Moving to FIG. 4B which shows the use of the dunnage device 10 in an ordinary boxcar 32 having a standard inside length of 52 ft. 6 in., it can be seen that when the car is filled with standard 4 ft. × 8 ft. parcels of plywood a space 34 approximately 6 inches wide is left. Thus, as with the 50 ft. 6 in. boxcar, the space is filled with a pair of rub strips 30 and dunnage devices 10 having rubber tubes 5 inches in diameter. However, in this case since no load-positioning equipment is utilized to keep the load from shifting laterally it is desirable to fill the rubber tubes to 40–70 p.s.i. which exerts a greater force against the parcels of plywood thereby tending to prevent them from shifting from side-to-side. Where a 52 ft. 8 in. boxcar is utilized dunnage devices with a seven-inch rubber tube and two-by-six boards should be used instead.

The operation of the dunnage device is explained with reference to FIGS. 5A and 5B. In FIG. 5A the dunnage device 10 is shown in its normal inflated, unloaded condition between two parcels of plywood 26 interfaced by rub strips 30. The parcels can move back and forth toward one another in the spaces 36 in response to normal shocks as indicated by the arrows 37, thereby flexing the rubber tube which absorbs some of their kinetic energy. However, when an extreme impact is received by the load the plywood parcels 26 will move inwardly as indicated by the arrows 38 in FIG. 5B collapsing the spaces 36. At the same time the flexible qualities of the canvass sack 18 and the walls of the rubber tube 12 enable the tube to assume an oblong shape and cause the boards 16 to move outwardly as indicated by the arrows 40. The rub strips 30 are jammed against the boards 16 which are incompressible and thus prevent the parcels of plywood from moving any further; therefore the rubber tube is protected from complete flattening and accompanying rupture. It can be seen that the rectangular cross-section of the boards 16 is particularly advantageous since it provides flat surfaces against which the parcels and tube may abut thereby evenly distributing the resulting forces and preventing the tube from being pinched between the parcels and the boards.

The terms and expressions which have been employed in the foregoing abstract and specification are used therein as terms of description and not of limitation, and there is no intention in the use of such terms and expressions of excluding the equivalents of the features shown and described or portions thereof, it being recognized that the scope of the invention is defined and limited only by the claims which follow.

What is claimed is:

1. A dunnage device, comprising:
   a. elongate flexible tube means for holding a compressible fluid;
   b. a pair of elongate stop members disposed adjacent said tube means on opposite sides thereof, the maximum width of said stop members in a dimension substantially perpendicular to a line drawn through the centers of said tube and both stop members being less than the maximum width of said tube in the same dimension when said tube is filled with said compressible fluid and fully expanded; and
   c. holding means connecting said tube means and said stop members together for holding said stop members adjacent said tube means, said holding means having a center portion wrapped around said tube means and two outer portions on opposite sides thereof wrapped around said stop members.

2. The device of claim 1 wherein said tube means is inflatable.

3. The device of claim 2 wherein said tube means includes a valve means for controlling the flow of said compressible fluid there-through disposed in one end of said tube means.

4. The device of claim 1 wherein said stop members comprise elongate boards of rectangular cross-section.

5. The device of claim 1 further comprising a plurality of said holding means distributed along the length of said device, each said holding means being made of a flexible material.

6. A dunnage device, comprising:
   a. elongate flexible tube means for holding a compressible fluid;
   b. a pair of elongate stop members disposed adjacent said tube means on opposite sides thereof, the maximum width of said stop members in a dimension substantially perpendicular to a line drawn through the centers of said tube and both stop members being less than the maximum width of said tube in the same dimension when said tube is filled with said compressible fluid and full expanded; and
   c. an elongate sack having a center pocket for receiving said tube means and two side pockets for receiving said stop members to position said tube means with respect to said stop members.

7. The device of claim 6 wherein said sack is made of canvass.

8. A dunnage device, comprising:
   a. elongate flexible tube means for holding a compressible fluid;
   b. a pair of elongate stop members disposed adjacent said tube means on opposite sides thereof, the maximum width of said stop members in a dimension substantially perpendicular to a line drawn through the centers of said tube and both stop members being less than the maximum width of said tube in the same dimension when said tube is filled with said compressible fluid and fully expanded; and
   c. a pair of separately-identifiable connecting means disposed on opposite sides of said tube means and connected thereto for holding said stop members in a predetermined orientation adjacent said tube means, each said stop member being connected to said tube means by a different one of said connecting means.

9. The device of claim 8 wherein said connecting means comprise flexible members wrapped around said respective stop members.

* * * * *